US012728503B2

(12) United States Patent
Takahashi

(10) Patent No.: US 12,728,503 B2
(45) Date of Patent: Sep. 8, 2026

(54) CLAMPING DEVICE

(71) Applicant: PASCAL ENGINEERING CORPORATION, Itami (JP)

(72) Inventor: Takuya Takahashi, Itami (JP)

(73) Assignee: PASCAL ENGINEERING CORPORATION, Itami (JP)

( * ) Notice: Subject to any disclaimer, the term of this patent is extended or adjusted under 35 U.S.C. 154(b) by 310 days.

(21) Appl. No.: 18/577,792

(22) PCT Filed: May 9, 2022

(86) PCT No.: PCT/JP2022/019643
§ 371 (c)(1),
(2) Date: Jan. 9, 2024

(87) PCT Pub. No.: WO2023/002738
PCT Pub. Date: Jan. 26, 2023

(65) Prior Publication Data
US 2024/0316729 A1 Sep. 26, 2024

(30) Foreign Application Priority Data
Jul. 19, 2021 (JP) ................................ 2021-118788

(51) Int. Cl.
*B25B 5/06* (2006.01)
*B25B 5/12* (2006.01)
*F15B 15/14* (2006.01)

(52) U.S. Cl.
CPC .......... *B25B 5/061* (2013.01); *F15B 15/1428* (2013.01); *B25B 5/064* (2013.01); *B25B 5/122* (2013.01)

(58) Field of Classification Search
CPC ........... B25B 5/04; B25B 5/064; B25B 5/061; B25B 5/122; F15B 15/1428
See application file for complete search history.

(56) References Cited

U.S. PATENT DOCUMENTS

2015/0145195 A1* 5/2015 Fukui ..................... B25B 5/122 269/32
2017/0113329 A1 4/2017 Takahashi

FOREIGN PATENT DOCUMENTS

| | | | |
|---|---|---|---|
| CN | 105715613 | A | 6/2016 |
| CN | 106102992 | A | 11/2016 |
| EP | 3 127 653 | B1 | 12/2018 |
| JP | 48-13689 | U | 2/1973 |
| JP | 50-2947 | Y1 | 1/1975 |
| JP | 63-99008 | U | 6/1988 |
| JP | 3-62204 | U | 6/1991 |

(Continued)

OTHER PUBLICATIONS

Extended European Search Report for European Application No. 22845676.0, dated May 28, 2025.

(Continued)

*Primary Examiner* — Christopher J. Besler
(74) *Attorney, Agent, or Firm* — Birch, Stewart, Kolasch & Birch, LLP

(57) ABSTRACT

A cylinder main body is provided with a first port that supplies fluid pressure to a first cylinder chamber, and a second port that supplies fluid pressure to a second cylinder chamber. The fluid pressure supplied to the first port is transmitted to the first cylinder chamber via a clearance formed in a double tube structure.

10 Claims, 4 Drawing Sheets

(56) References Cited

FOREIGN PATENT DOCUMENTS

| | | | |
|---|---|---|---|
| JP | 4-175503 | A | 6/1992 |
| JP | 4-95303 | U | 8/1992 |
| JP | 11-280709 | A | 10/1999 |
| JP | 2003-103425 | A | 4/2003 |
| JP | 2003-194016 | A | 7/2003 |
| JP | 2015-42880 | A | 3/2015 |
| JP | 2015-199139 | A | 11/2015 |
| JP | 2015-223647 | A | 12/2015 |
| JP | 2018-1380 | A | 1/2018 |
| JP | 2018-3958 | A | 1/2018 |
| WO | WO 2019/026584 | A1 | 2/2019 |

OTHER PUBLICATIONS

Japanese Office Action for Japanese Application No. 2021-118788, dated May 27, 2025, with English translation.
International Search Report (PCT/ISA/210), issued in PCT/JP2022/019643, dated Jul. 19, 2022.
Japanese Third Party Observation, issued in Priority Application No. 2021-118788, dated Jul. 27, 2023.
Japanese Office Action for Japanese Application No. 2021-118788, dated Sep. 2, 2025, with English translation.
Chinese Office Action and Search Report for Chinese Application No. 202280050116.9, dated Apr. 17, 2026, with English translation of the Office Action.

* cited by examiner

CLAMPING DEVICE

TECHNICAL FIELD

The present technology relates to a clamping device.

BACKGROUND ART

There has been conventionally known a cylinder device that operates an output member using fluid pressure such as air pressure or hydraulic pressure. There has been also known a clamping device that fixes a fixation-target object to a base using an output of a cylinder device.

CITATION LIST

Patent Literature

PTL 1: Japanese Patent Laying-Open No. 2003-103425
PTL 2: WO 2019/026584
PTL 3: Japanese Patent Laying-Open No. 04-175503
PTL 4: Japanese Examined Utility Model Publication No. 50-2947
PTL 5: Japanese Utility Model Laying-Open No. 48-13689

SUMMARY OF INVENTION

Technical Problem

Further downsizing of the clamping device has been required. It is an object of the present technology to provide a downsized clamping device.

Solution to Problem

A clamping device according to the present technology is a clamping device that is able to fix a fixation-target object to a base body, the clamping device including: a cylinder main body fixed to the base body; an output member reciprocally movable with respect to the cylinder main body; a first cylinder chamber that drives the output member in a first direction; and a second cylinder chamber that drives the output member in a second direction. The cylinder main body includes a main body portion having a double tube structure with an inner peripheral tube portion and an outer peripheral tube portion, and a clearance is formed between the inner peripheral tube portion and the outer peripheral tube portion. The output member includes a rod portion protruding from the cylinder main body, and a piston portion connected to the rod portion and partitioning a space inside the inner peripheral tube portion into the first cylinder chamber and the second cylinder chamber. The cylinder main body is provided with a first port that supplies fluid pressure to the first cylinder chamber, and a second port that supplies fluid pressure to the second cylinder chamber. The fluid pressure supplied to the first port is transmitted to the first cylinder chamber via the clearance formed in the double tube structure.

Advantageous Effects of Invention

According to the present technology, a clamping device can be downsized.

DESCRIPTION OF EMBODIMENTS

Figure 1:
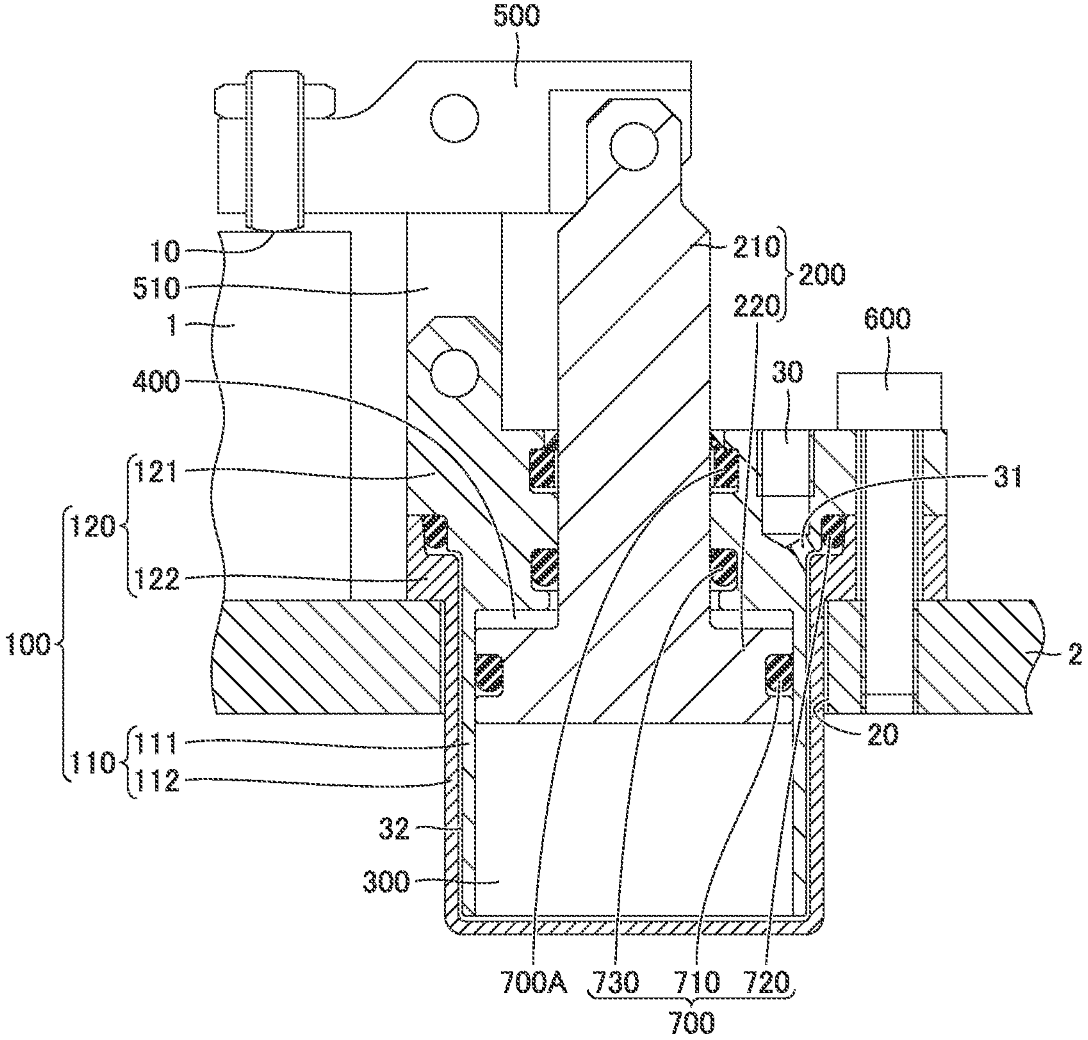
FIG. 1 is a longitudinal cross sectional view showing a first state (clamping state) of a clamping device according to one embodiment.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

Figure 2:
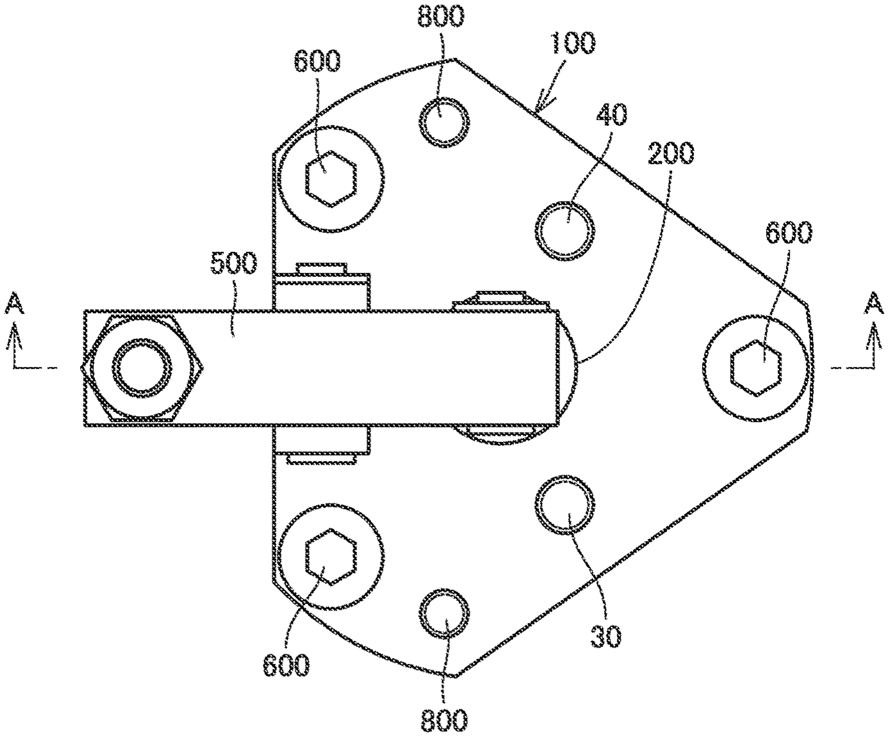
FIG. 2 is a top view of the clamping device shown in FIG. 1.

FIG. 1 is a longitudinal cross sectional view showing a first state (clamping state) of a clamping device (link clamp) according to the present embodiment, and FIG. 2 is a top view of the clamping device shown in FIG. 1. FIG. 1 shows an A-A cross section in FIG. 2 together with a first port 30 (its radial position when viewed from the center of a cylinder is maintained).

The clamping device according to the present embodiment is a clamping device that can fix a fixation-target object 1 to a base body 2. In an example of FIG. 1, a fixation position 10 of fixation-target object 1 is fixed by the clamping device.

As shown in FIGS. 1 and 2, the clamping device includes a cylinder main body 100, an output member 200, a first cylinder chamber 300, a second cylinder chamber 400, a clamping arm 500, bolts 600, a sealing member 700, and bolts 800.

Cylinder main body 100 is fixed to base body 2. Cylinder main body 100 includes a main body portion 110 and a flange portion 120.

Main body portion 110 of cylinder main body 100 is inserted and fit in a hole portion 20 provided in base body 2. Main body portion 110 has a double tube structure with an inner peripheral tube portion 111 and an outer peripheral tube portion 112.

Flange portion 120 of cylinder main body 100 extends outward in a radial direction of cylinder main body 100 with respect to hole portion 20 and is in abutment with an upper surface of base body 2. Flange portion 120 has a first portion 121 formed in one piece with inner peripheral tube portion 111 and a second portion 122 formed in one piece with outer peripheral tube portion 112. First portion 121 and second portion 122 of flange portion 120 are positioned relative to each other in upward and downward directions by bringing first portion 121 and second portion 122 into abutment with each other in the upward direction and the downward direction. The upper surface of flange portion 120 is formed to be flat so as to extend in a horizontal direction.

Output member 200 is provided to be reciprocally movable with respect to cylinder main body 100. Output member 200 includes a rod portion 210 protruding from cylinder main body 100, and a piston portion 220 connected to rod portion 210 and partitioning a space inside inner peripheral tube portion 111 into first cylinder chamber 300 and second cylinder chamber 400.

First cylinder chamber 300 is formed in an inner space of main body portion 110 of cylinder main body 100. More specifically, first cylinder chamber 300 is formed inside inner peripheral tube portion 111. First cylinder chamber 300 drives output member 200 in the upward direction (first direction). In the state (clamping state) shown in FIG. 1, fluid pressure is supplied to first cylinder chamber 300.

Second cylinder chamber 400 is formed in the inner space of main body portion 110 of cylinder main body 100. More specifically, second cylinder chamber 400 is formed inside inner peripheral tube portion 111. Second cylinder chamber 400 drives output member 200 in the downward direction (second direction). In the state (clamping state) shown in FIG. 1, fluid pressure in second cylinder chamber 400 is released.

Clamping arm 500 is rotatably attached to an upper end portion of output member 200. Further, a link member 510 is attached to connect cylinder main body 100 and clamping arm 500. Link member 510 is rotatably connected to cylinder main body 100 and clamping arm 500. Cylinder main body 100, output member 200, clamping arm 500, and link member 510 form a link mechanism. In response to upward/downward movement of output member 200, the link mechanism is driven to rotate clamping arm 500. In this way, a clamping operation and an unclamping operation are realized.

Each of bolts 600 fixes cylinder main body 100 to base body 2. Bolt 600 extends through first portion 121 and second portion 122 of flange portion 120 of cylinder main body 100 from above. The tip (lower end) of bolt 600 is fixed to base body 2. It should be noted that instead of bolt 600, another fastening member such as a pin may be used.

Sealing member 700 includes a first sealing member 710, a second sealing member 720, and a third sealing member 730.

First sealing member 710 is provided on an outer periphery of piston portion 220 of output member 200. First sealing member 710 seals between first cylinder chamber 300 and second cylinder chamber 400.

Second sealing member 720 is provided between first portion 121 and second portion 122 of flange portion 120 of cylinder main body 100. An installation position of second sealing member 720 (in the upward/downward direction and the radial direction) can be appropriately changed in flange portion 120. Second sealing member 720 seals between first cylinder chamber 300 and outside of cylinder main body 100. First portion 121 and second portion 122 of flange portion 120 of cylinder main body 100 are positioned relative to each other along the radial direction with second sealing member 720 provided therebetween. FIG. 1 shows a state in which ideal positioning has been performed such that respective axial centers of inner peripheral tube portion 111 and outer peripheral tube portion 112 coincide with each other; however, slight positional deviation (deviation between the axial centers of inner peripheral tube portion 111 and outer peripheral tube portion 112) due to deformation of second sealing member 720 is permitted as long as a flow path to first cylinder chamber 300 is secured.

Third sealing member 730 is provided between rod portion 210 of output member 200 and cylinder main body 100. Third sealing member 730 seals between second cylinder chamber 400 and the outside of cylinder main body 100. A scraper 700A (dust seal) is provided above third sealing member 730.

Figure 3:
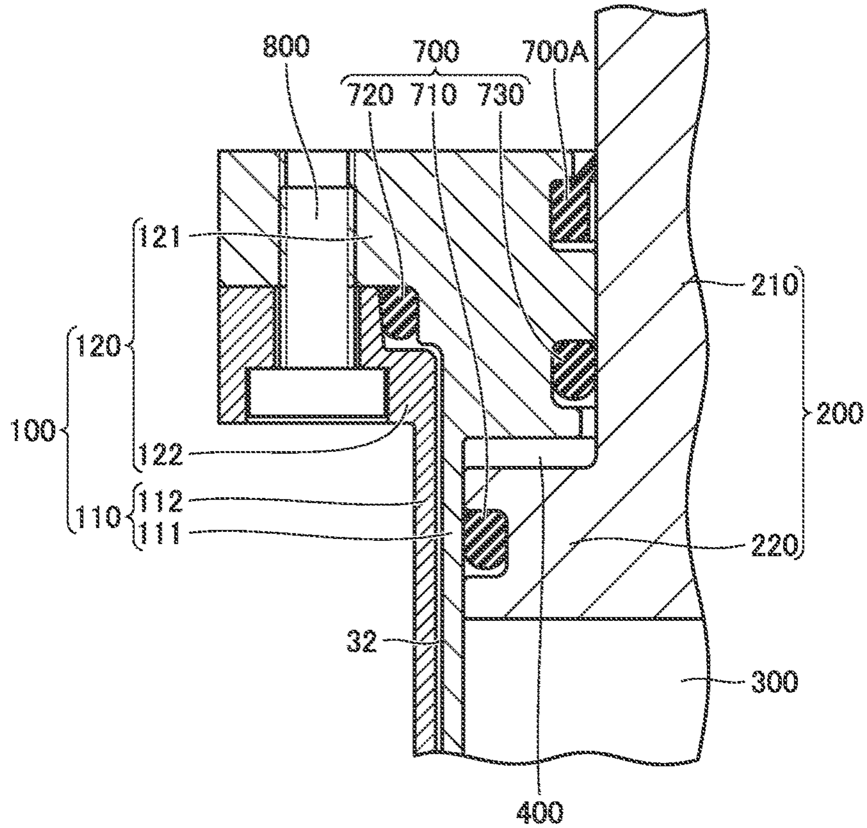
FIG. 3 is a cross sectional view of surroundings of a bolt 800 shown in FIG. 2.

FIG. 3 is a cross sectional view of surroundings of each bolt 800. As shown in FIG. 3, bolt 800 extends through first portion 121 and second portion 122 of flange portion 120 of cylinder main body 100 from below. The tip (upper end) of bolt 800 is fixed to first portion 121. It should be noted that instead of bolt 800, another fastening member such as a pin may be used.

As shown in FIG. 2, first port 30 and a second port 40 are provided in the upper surface of cylinder main body 100. First port 30 and second port 40 are provided in cylinder main body 100 so as to open in the upward direction. Each of first port 30 and second port 40 is formed in first portion 121 of flange portion 120. Each of first port 30 and second port 40 is provided at a position close to the axial center of output member 200 with respect to bolt 600 and bolt 800. First port 30 and second port 40 are positioned opposite to each other with respect to the central axis (axis extending in the leftward/rightward direction in FIG. 2) of clamping arm 500. Each of first port 30 and second port 40 is provided at a position not overlapping with clamping arm 500 (in the clamping state, unclamping state, and intermediate state therebetween) when the clamping device is viewed in the upward direction or the downward direction.

First port 30 is a port for supplying fluid pressure to first cylinder chamber 300. Second port 40 is a port for supplying fluid pressure to second cylinder chamber 400.

As shown in FIG. 1, first port 30 communicates with first cylinder chamber 300 via an inclined hole 31 and a clearance 32. The fluid pressure supplied to first port 30 can be supplied to first cylinder chamber 300 via inclined hole 31 and clearance 32. The fluid pressure supplied to first cylinder chamber 300 can be released from first port 30 via clearance 32 and inclined hole 31.

Inclined hole 31 extends from a bottom portion of first port 30 in a direction obliquely intersecting the upward direction and the downward direction, and reaches clearance 32. Inclined hole 31 connects first port 30 and clearance 32. Inclined hole 31 is inclined outward in the radial direction of cylinder main body 100 as it extends in the downward direction of cylinder main body 100. An inclination angle of inclined hole 31 with respect to the upward/downward direction is about 5° or more and 600 or less (more preferably, about 15° or more and 450 or less). However, the inclination angle is not limited to the above range.

Clearance 32 is formed between inner peripheral tube portion 111 and outer peripheral tube portion 112 of main body portion 110 of cylinder main body 100. When the clamping device is viewed in the upward direction or the downward direction, clearance 32 formed in the double tube structure of cylinder main body 100 is formed between first sealing member 710 and second sealing member 720. Clearance 32 is formed across an entire length of the double tube structure of cylinder main body 100.

The upper end of clearance 32 communicates with inclined hole 31. The lower end of clearance 32 communicates with first cylinder chamber 300. Clearance 32 is formed to have an annular shape so as to surround an entire periphery of inner peripheral tube portion 111. Hence, the width of clearance 32 in the radial direction may be smaller than the diameter of inclined hole 31. Here, the "width of clearance 32 in the radial direction" means the width of clearance 32 in the radial direction in a state in which the ideal positioning has been performed such that the axial centers of inner peripheral tube portion 111 and outer peripheral tube portion 112 coincide with each other.

Figure 4:
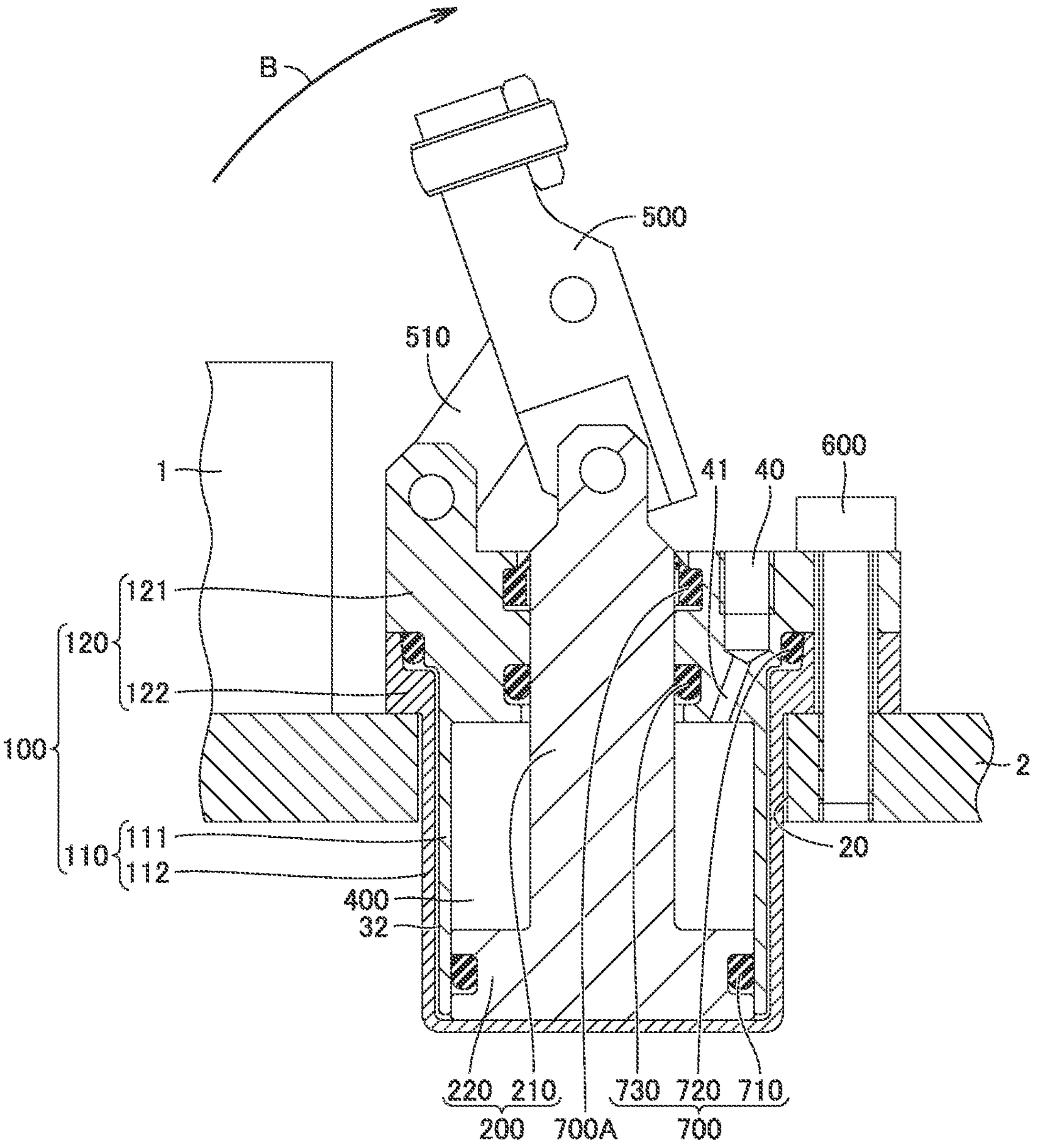
FIG. 4 is a longitudinal cross sectional view showing a second state (unclamping state) of the clamping device according to one embodiment.

FIG. 4 is a longitudinal cross sectional view showing a second state (unclamping state) of the clamping device (link clamp) according to the present embodiment. FIG. 4 is a cross sectional view showing a cross section corresponding to the A-A cross section in FIG. 2 together with second port 40 (its radial position when viewed from the center of the cylinder is maintained).

As shown in FIG. 4, second port 40 communicates with second cylinder chamber 400 via an inclined hole 41. The fluid pressure supplied to second port 40 can be supplied to second cylinder chamber 400 via inclined hole 41. The fluid pressure supplied to second cylinder chamber 400 can be released from second port 40 via inclined hole 41.

Inclined hole 41 extends from a bottom portion of second port 40 in a direction obliquely intersecting the upward direction and the downward direction, and reaches second cylinder chamber 400. Inclined hole 41 connects second port 40 and second cylinder chamber 400. Inclined hole 41 is inclined inward in the radial direction of cylinder main body 100 as it extends in the downward direction of cylinder main body 100. An inclination angle of inclined hole 41 with respect to the upward/downward direction is about 0° or more and 450 or less (more preferably, about 100 or more and 300 or less). However, the inclination angle is not limited to the above range.

From the state (clamping state) shown in FIG. 1, the fluid pressure in first cylinder chamber 300 is released and the fluid pressure is supplied to second cylinder chamber 400, with the result that output member 200 is driven downward and the link mechanism is driven to rotate clamping arm 500 in a direction of arrow B. Thus, the state shown in FIG. 4 (unclamping state) is realized.

Figure 5:
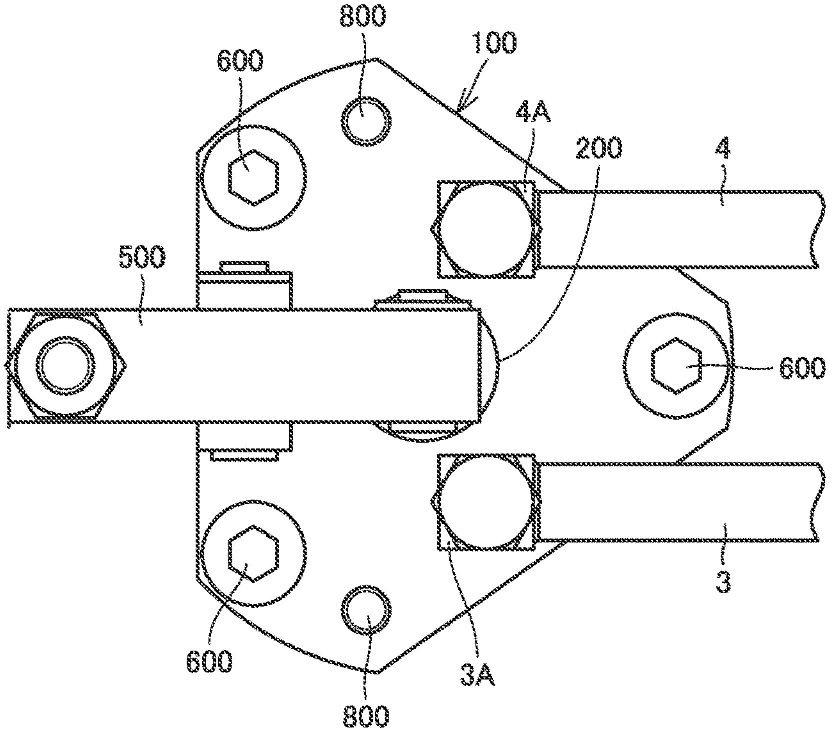
FIG. 5 is a top view showing a state in which a fluid pipe is connected to the clamping device shown in FIGS. 1 to 4.
Figure 6:
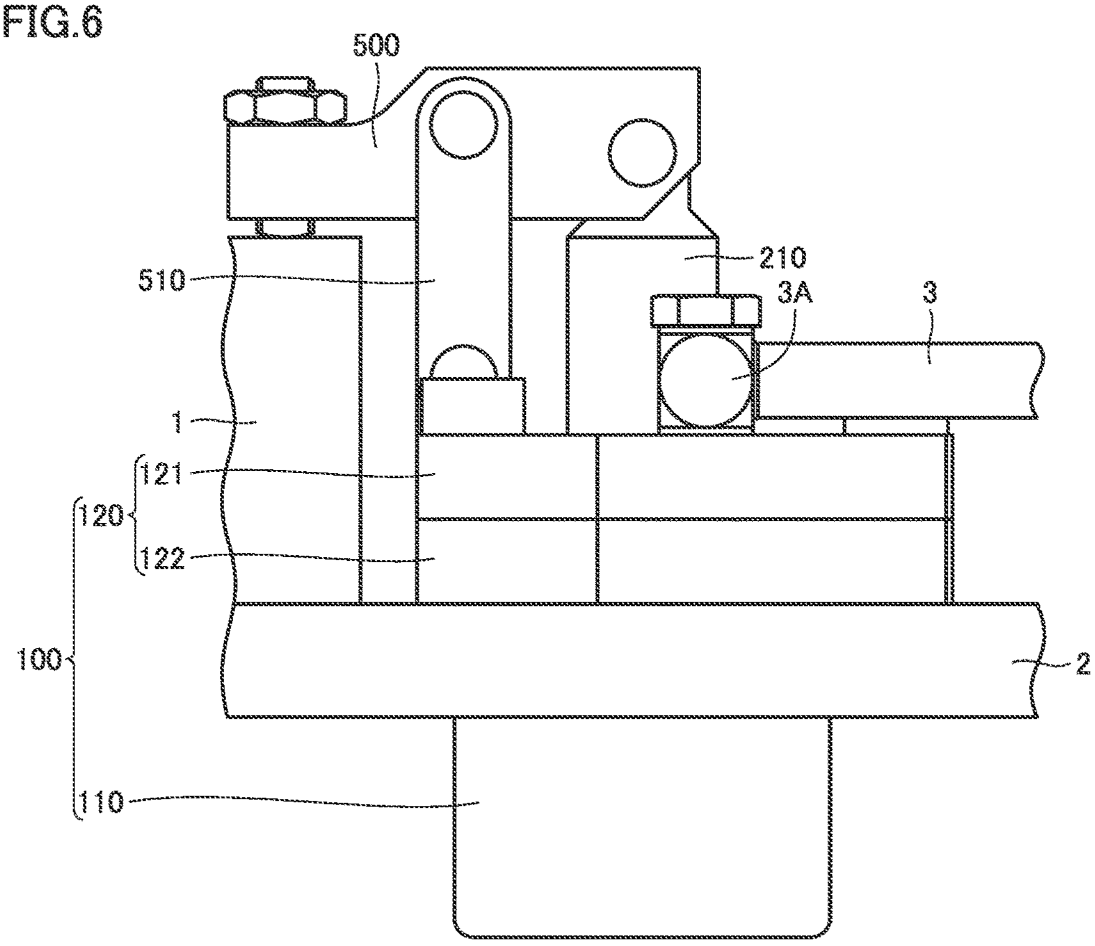
FIG. 6 is a front view showing a state of FIG. 5.

FIG. 5 is a top view showing a state in which fluid pipes 3, 4 are connected to the clamping device. FIG. 6 is a front view showing the state of FIG. 5.

As shown in FIGS. 5 and 6, fluid pipe 3 is connected to first port 30 at a connection portion 3A. The fluid pressure is supplied to and released from first cylinder chamber 300 via fluid pipe 3. Fluid pipe 4 is connected to second port 40 at a connection portion 4A. The fluid pressure is supplied to and released from second cylinder chamber 400 via fluid pipe 4. Each of connection portions 3A, 4A may be provided with a flow rate adjustment valve that adjusts a flow rate of a working fluid.

In the clamping device according to the present embodiment, each of first port 30 and second port 40 is provided so as to open on the upper side of cylinder main body 100 (side opposite to base body 2), and therefore no flow path needs to be provided in base body 2. Therefore, base body 2 can be made thin. As a result, the entire mechanism including the clamping device can be downsized in the upward/downward direction.

In the clamping device according to the present embodiment, the fluid pressure is supplied to first cylinder chamber 300 on the lower side via clearance 32 formed by the double tube structure, thereby simplifying a process for forming a flow path in cylinder main body 100. In particular, a hole process for forming a flow path in main body portion 110 of cylinder main body 100 in the upward/downward direction can be omitted. As a result, cylinder main body 100 can be downsized by an amount corresponding to a processing margin required for the hole process, thus resulting in downsizing of the clamping device.

In the clamping device described above, the outer diameter of main body portion 110 of cylinder main body 100 can be, for example, about 10 mm or more and 40 mm or less (more preferably, about 15 mm or more and 30 mm or less). The height of cylinder main body 100 (height from the bottom surface of main body portion 110 to the upper surface of flange portion 120) may be about 20 mm or more and 100 mm or less (more preferably, about 30 mm or more and 70 mm or less). However, the sizes of cylinder main body 100 are not limited to those described above.

The clamping device described above can be used not only for an application for fixing a workpiece to be cut but also for an application required to attain further downsizing such as a transferring device or an assembling device. However, the application of the clamping device according to the present technology is not limited to the above.

In the above-described embodiment, the explanation has been made with regard to the link clamp having link member 510 with output member 200 being moved upward and downward without involving pivoting movement; however, the clamping device according to the present technology is not limited to the link clamp, and may be another type of clamping device such as a swing clamp. It should be noted that since output member 200 and clamping arm 500 are not pivoted in the link clamp, a degree of freedom of arrangement of each of first port 30 and second port 40 provided in the upper surface of cylinder main body 100 is high, with the result that the clamping device can be further downsized as compared with the swing clamp.

In the above-described embodiment, the explanation has been made with regard to the air cylinder using air pressure as the fluid pressure supplied to each of first cylinder chamber 300 and second cylinder chamber 400; however, the fluid pressure cylinder according to the present technology is not limited to the air cylinder, and may be, for example, a hydraulic cylinder using hydraulic pressure. The fluid pressure supplied to each of first cylinder chamber 300 and second cylinder chamber 400 is, for example, about 1 MPa or less. By restricting the fluid pressure to about 1 MPa or less, inner peripheral tube portion 111 and outer peripheral tube portion 112 of main body portion 110 of cylinder main body 100 can be formed to be thinner, with the result that the clamping device can be further downsized. However, in the present technology, the fluid pressure is not limited to the above range.

In the above-described embodiment, the explanation has been made with regard to the structure in which output member 200 is driven only by the fluid pressure; however, first cylinder chamber 300 or second cylinder chamber 400 may be provided with a biasing member that drives output member 200 in an auxiliary manner in addition to the fluid pressure or instead of the fluid pressure.

Although the embodiments of the present technology have been described and illustrated in detail, it is clearly understood that the same is by way of illustration and example only and is not to be taken by way of limitation. The scope of the present technology is defined by the terms of the claims, and is intended to include any modifications within the scope and meaning equivalent to the terms of the claims.

REFERENCE SIGNS LIST

1: fixation-target object; 2: base body; 3, 4: fluid pipe; 3A, 4A: connection portion; 10: fixation position; 20: hole portion; 30: first port; 31: inclined hole; 32: clearance; 40: second port; 41: inclined hole; 100: cylinder main body; 110: main body portion; 111: inner peripheral tube portion; 112: outer peripheral tube portion; 120: flange portion; 121: first portion; 122: second portion; 200: output member; 210: rod portion; 220: piston portion; 300: first cylinder chamber; 400: second cylinder chamber; 500: clamping arm; 510: link member; 600: bolt; 700: sealing member; 700A: scraper; 710: first sealing member; 720: second sealing member; 730: third sealing member; 800: bolt.

The invention claimed is:

1. A clamping device that is able to fix a fixation-target object to a base body, the clamping device comprising:

a cylinder main body configured to be fixed to the base body;

an output member reciprocally movable with respect to the cylinder main body;

a first cylinder chamber that is configured to drive the output member in a first direction; and a second cylinder chamber that is configured to drive the output member in a second direction, wherein the cylinder main body includes a main body portion having a double tube structure with an inner peripheral tube portion and an outer peripheral tube portion, and a clearance is formed between the inner peripheral tube portion and the outer peripheral tube portion, the output member includes a rod portion protruding from the cylinder main body, and a piston portion connected to the rod portion and partitioning a space inside the inner peripheral tube portion into the first cylinder chamber and the second cylinder chamber, the cylinder main body is provided with a first port that is configured to supply fluid pressure to the first cylinder chamber, and a second port that is configured to supply fluid pressure to the second cylinder chamber, and the fluid pressure supplied to the first port is transmitted to the first cylinder chamber via the clearance formed in the double tube structure.

2. The clamping device according to claim 1, wherein the main body portion of the cylinder main body is configured to be inserted in a hole portion provided in the base body, the cylinder main body includes a flange portion extending outward in a radial direction of the cylinder main body, the flange portion being configured to be in abutment with a surface of the base body that faces the first direction, and the flange portion has a first portion formed in one piece with the inner peripheral tube portion and a second portion formed in one piece with the outer peripheral tube portion.

3. The clamping device according to claim 2, wherein each of the first port and the second port is formed in the first portion.

4. The clamping device according to claim 2, further comprising a first seal provided on an outer periphery of the piston portion and a second seal provided between the first portion and the second portion of the flange portion, wherein when the clamping device is viewed in the first direction or the second direction, the clearance formed in the double tube structure is formed between the first seal and the second seal.

5. The clamping device according to claim 4, wherein the first portion and the second portion of the flange portion are positioned relative to each other in the first direction and the second direction, wherein the first portion and the second portion are in abutment with each other in the first direction and the second direction, and the first portion and the second portion are positioned in the radial direction of the cylinder main body with the second seal provided between the first portion and the second portion.

6. The clamping device according to claim 1, wherein the clearance formed between the inner peripheral tube portion and the outer peripheral tube portion is formed across an entire length of the double tube structure.

7. The clamping device according to claim 1, wherein the clearance formed between the inner peripheral tube portion and the outer peripheral tube portion is formed to have an annular shape so as to surround an entire periphery of the inner peripheral tube portion.

8. The clamping device according to claim 1, wherein a flow path is formed to extend from a bottom portion of the first port in a direction obliquely intersecting the first direction and the second direction and to reach the clearance formed between the inner peripheral tube portion and the outer peripheral tube portion.

9. The clamping device according to claim 1, wherein the output member is configured to be reciprocally moved with respect to the cylinder main body without involving pivoting movement.

10. The clamping device according to claim 1, wherein each of the first port and the second port is provided in the cylinder main body, and is configured to open on a side opposite to the base body.

* * * * *